Sept. 16, 1952

P. J. CADE ET AL 2,611,007

TEMPERATURE-COMPENSATING CONDUCTIVITY CELL

Filed Feb. 2, 1951

INVENTORS: P. J. CADE
B. E. SHAW
BY
*[signature]*
ATTORNEY

Patented Sept. 16, 1952

2,611,007

UNITED STATES PATENT OFFICE 2,611,007

TEMPERATURE-COMPENSATING CONDUCTIVITY CELL

Phillip J. Cade, Winchester, and Burton E. Shaw, East Boxford, Mass., assignors to Photoswitch Marine Division, Inc., New York, N. Y., a corporation of New York Application February 2, 1951, Serial No. 209,158

7 Claims. (Cl. 175—183)

This invention relates generally to apparatus for measuring the electrical conductivity of fluids whereby quantitative indications of the electrolyte concentration thereof may be had, as well as fluid system control which is responsive to said electrolyte concentration. This invention relates particularly to automatic temperature-compensating conductivity cells or probes, which, when immersed in an electrolyte solution and connected to auxiliary apparatus, produce an output function responsive only to the electrolyte concentration of the solution under test.

It is customary to employ apparatus of this type aboard all large seagoing vessels which utilize sea water for boiler feed-water, drinking, cooling and other water requirements. In order that this water may be suitable for these purposes, it is necessary that it be distilled to remove the dissolved salts. A continual salinity check should be made of the output of the distilling apparatus to detect the presence of sea salt therein.

Practically all salinity checking arrangements of the prior art employ conductivity cells. Basically, a conductivity cell usually comprises two electrodes whose spacing and liquid contact area are accurately fixed. When this cell is immersed in the liquid to be tested and connected to auxiliary apparatus, the electrical impedance of the liquid volume between the electrodes can be determined. Since the impedance of a saline solution varies inversely to the concentration of the electrolyte, continual or periodic electrical conductivity testing of the portion of the liquid sampled by a set of these cell electrodes will disclose minute changes in the salinity of the liquid. These electrical conductivity values are easily converted to equivalent concentrations of sea salt by a properly calibrated metering circuit.

Unfortunately, the impedance of a saline solution is affected not only by the electrolyte concentration thereof, but also by the temperature of the liquid. Temperature-compensating conductivity cells have, therefore, been utilized in the prior art to compensate for the inaccuracies in salinity measurements and control introduced by ambient temperature changes in the liquid under test. These cells usually comprise, in addition to the electrodes of the basic cell, a temperature-compensating impedance element having substantially the same negative temperature coefficient of impedance as the saline solution under test. The complete temperature-compensating conductivity cell, therefore, comprises two impedance elements, the temperature-compensating impedance element and the volume of the liquid under test between the basic cell electrodes. When these two impedance elements are properly connected to auxiliary circuits and subjected to the same temperature changes, the ratio of the output current from each element is responsive, for all practical purposes, only to variations in the electrolyte concentration of the liquid under test. Thus, the temperature-compensating conductivity cell can give an indication influenced only by salt concentration. This same cell can also be connected to liquid control apparatus which is responsive only to salt concentration.

Satisfactory operation of the aforementioned temperature-compensating conductivity cells depends, to a large extent, upon the efficiency of the thermal coupling between the liquid under test and the temperature-compensating impedance element. Inadequate thermal coupling will introduce an objectionable time delay before accurate salinity measurements and control can be provided by the cell. The structure of the means employed to electrically insulate the basic electrodes from one another is also vitally important to proper operation of the cell. This insulating means must be capable of resisting the deteriorating effects of the liquid under test and also not permit the formation of an electrical current leakage path between the electrodes. In addition, the insulating means must, in the usual case, provide an adequate seal to prevent the liquid under test from escaping from the liquid system by leaking through the cell.

In many of the arrangements of the prior art, the compensating element has comprised a vessel filled with a liquid of substantially the same electrolyte composition as the liquid under test. In another type of conductivity cell, the compensating impedance element has comprised a solid resistor having an elongated cylindrical shape. This resistor was located within one of the electrodes of the basic cell, which electrode formed a container for the resistor. In these cell arrangements, an insulating gasket or a ceramic shell was used to insulate the basic electrodes from one another and provide a liquid seal.

The novel temperature-compensating conductivity cell structure of this invention contemplates a basic cell which includes a tubular outer electrode enveloping an inner container electrode. The two electrodes are insulated from one another by a resilient sealing ring to which there is applied a continual self-adjusting spring force. This self-adjusting force causes an annular tooth of an adapter piece and an annular tooth of the container electrode to bite into the sealing ring, thereby providing a dynamic seal of long life. The sealing ring, which is preferably constructed of polytetra-fluorethylene, commonly known as teflon, will also not crack or permit the formation of a leakage path on the surface thereof.

A temperature-compensating resistor is located within the inner container electrode. This resistor is a solid disc-type element, one circular surface of which is soldered directly to an inner surface of the container electrode. This structural arrangement provides for a short metallic thermal path between the liquid under test and a large surface area of the compensating element. This feature of the invention minimizes the time delay heretofore present in temperature-compensating conductivity cells.

Another feature of this invention, which will be readily apparent from the detailed description hereinafter set forth, is the comparative ease with which the component parts of the conductivity cell may be disassembled for replacement of defective components thereof.

Accordingly, it is an object of this invention to improve the sensitivity and accuracy of automatic temperature-compensating conductivity cells.

Another object is to improve the liquid seal of conductivity cells whereby leakage of the liquid under test through the internal cell structure can be minimized.

Another object is to improve the structure of temperature-compensating conductivity cells so that replacement of defective components thereof is facilitated.

In order that the mode of operation of the novel structure for attaining the aforementioned objects may be readily understood, reference is herein made to the drawings, wherein.

Figure 1:
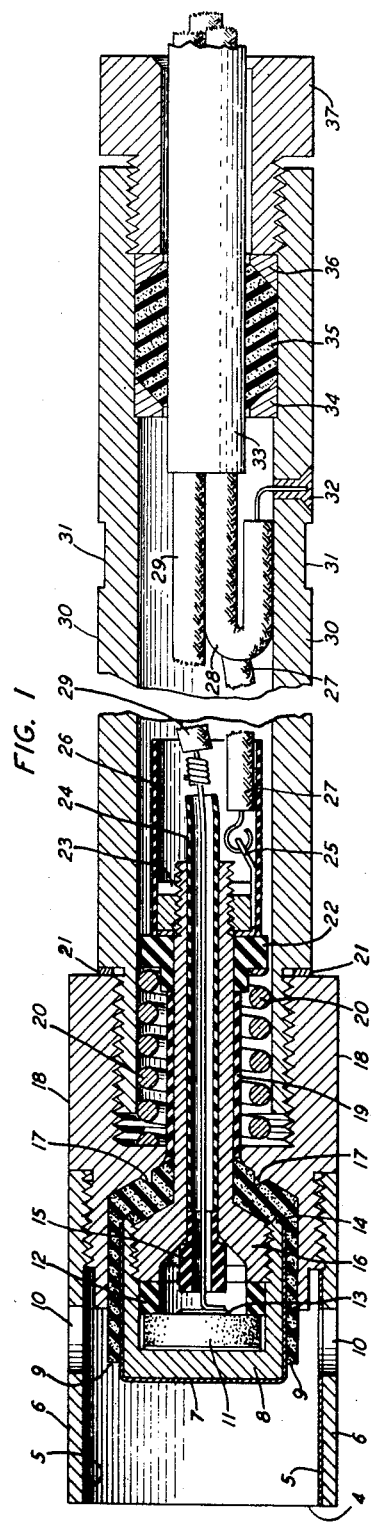
Fig. 1 is a sectional view of the conductivity cell of this invention, with a center portion of the cell tube thereof broken away, and the liquid system attaching structure removed.

Referring now, in the main, to Fig. 1, when the operating portion of the conductivity cell of this invention is immersed in the liquid under test, the inner surface 5 of metallic electrode 6 and the outer surface 7 of metallic inner container electrode 8 are wetted by liquid flowing through side apertures 10 and end opening 4. The liquid volume between surfaces 5 and 7 comprises a first impedance element of the conductivity cell. Surfaces 5 and 7 are preferably of a noble metal, such as platinum or gold, so that electrode corrosion is kept to a minimum.

The circular left surface of temperature-compensating resistor 11 is soldered to the inner surface of electrode 8. Insulating spacer 12 assures the permanence of this soldered connection by mechanically supporting resistor 11. Because of the thin disc-like structure of the resistor, a high degree of thermal coupling exists between the liquid under test and the mass of the resistor. It is to be noted that the short thermal path to the resistor surface contacting electrode 8 is completely metallic. The cylindrical side surface of resistor 11 is preferably separated from the inner side surface of electrode 8 by a few thousandths of an inch. Resistor 11, for most efficient temperature-compensation, should have substantially the same tmeperature coefficient of resistance as the liquid under test. In a preferred embodiment of this invention, resistor 11 is a thermistor constructed of Carborundum composition material which can be purchased from the Carborundum Company, Niagara Falls, New York. Insulating and sealing ring 9 prevents electrode 8 from making electrical contact with electrode 6 through metallic adapter piece 18, and inasmuch as spacer 12 is an insulator, the right surface of resistor 11 is prevented from making electrical contact with electrode holder 16.

Electrically speaking, the temperature-compensating conductivity cell of this invention, therefore, comprises two impedance elements with one terminal of each element being commonly connected. That is, the left surface of resistor 11 is connected electrically to container electrode 8 by the common soldered junction therebetween. An external electrical connection is made to this common junction by conductor 27 through soldering lug 25, which lug contacts metallic electrode holder 16, and which holder is in turn screwed to electrode 8. Soldering lug 25 is held in place by slotted nut 23. Lug 25 and the soldered connection thereto and nut 23 are insulated from cell tube 30 by insulating sleeve 26. Electrode holder 16 is insulated by bushing 22 and insulating sleeve 19.

Electrical connection is made to the right surface of resistor 11 by conductor 29. A loop 13 of this conductor is soldered to the right surface of resistor 11. Conductor 29 is insulated from electrode holder 16 by insulating pieces 15 and 24.

Electrical connection is made to electrode 6 by soldering conductor 28 to metallic cell tube 30 at 32, which cell tube is, in turn, screwed to the adapter piece 18-electrode 6 combination. Gasket 21, which is preferably of a soft material such as copper, forms a liquid seal between adapter piece 18 and cell tube 30.

The liquid under test is prevented from leaking into the inner portions of cell tube 30 by the commonly contacting surfaces of ring 9 and adapter piece 18 and the commonly contacting surfaces of ring 9 and electrode holder 16 plus surface 7. The liquid seal between these surfaces is kept tight by the continual force applied to electrode holder 16 and electrode 8 through nut 23 and bushing 22 by compressed spring 20. This force, which is directed to the right, compresses resilient ring 9, and causes annular tooth 17 of adapter piece 18 and the annular tooth 14 of electrode 8 to bite deeply into ring 9. Ring 9 is preferably constructed of a liquid-resistive material such as teflon. An adjustment of slotted nut 23 will vary the amount of compression applied to the insulating ring.

Conductors 27, 28 and 29 are prevented from applying a pulling force to their respective internal connections by gland nut 37, which when tightened sufficiently, applies a force to gland rings 34 and 36, thereby compressing resilient packing 35. Packing 35 applies a frictional force to sheath 33, thereby holding the conductors in a fixed position.

Figure 2:
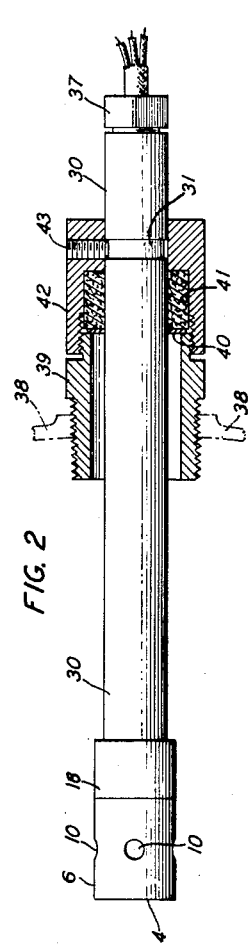
Fig. 2 is a front elevation of the conductivity cell of Fig. 1, with the structure for attaching the cell to a liquid system shown in section.
Figure 3:
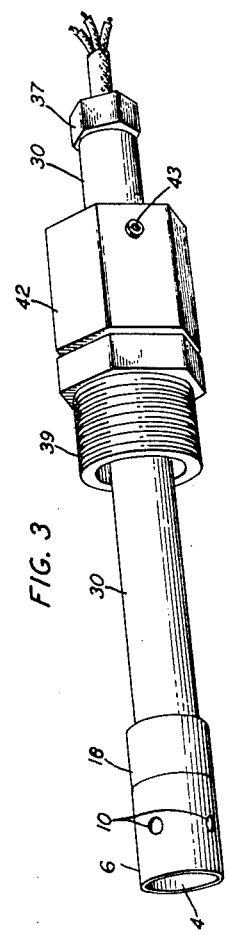
Fig. 3 is a perspective view of the complete conductivity cell of this invention.

The conductivity cell structure of Fig. 1 is connected to a pipe, boiler, or other testing point of a liquid system by the attaching structure which is shown in section in Fig. 2. This attaching structure is connected to fragmentary portions of piping 38 of the liquid system. A complete showing of the liquid system would disclose that the portion of the conductivity cell to the left of the fragmentary piping shown is immersed in liquid, at least to the extent that the common volume between electrodes 6 and 8 is filled.

The attachment of the complete conductivity cell to piping 38 is as follows: with gland nut 37 removed, nipple 39 is screwed to packing nut 42, which nut is loaded with spacer 40 and packing ring 41. This attaching structure is affixed to cell tube 30 by passing the structure over a portion of cell tube 30 until set screw 43 can be screwed into flat-bottomed groove 31. Gland nut 37 is then added. The entire combination is then screwed into piping 38 as shown in Fig. 2.

The disassembly of the complete conductivity cell is as follows: the pipe attaching structure is removed from cell tube 30 after loosening set screw 43 and removing gland nut 37. Packing rings 34 and 36, including packing 35, are then removed. The soldered connection at 32 is then broken by applying a hot soldering iron thereto. After cell tube 30 is unscrewed from the rest of the cell assembly, gasket 21 is removed. Conductor 27 is then unsoldered from lug 25 and conductor 29 is cut near the splice. After insulating sleeve 26, lug 25 and nut 23 are removed, bushing 22 and piece 19, together with spring 20, are removed. Electrode 6 is then unscrewed from adapter piece 18. After the removal of adapter piece 18 from the rest of the remaining assembly, sealing ring 9 is slipped off of electrode holder 16. Finally, electrode 8 is unscrewed from the electrode holder 16.

The assembly of the complete conductivity cell is substantially the reverse of the disassembly procedure.

A circuit for utilizing the temperature-compensating conductivity cell of this invention for quantitative indications and control of salinity concentration is disclosed in an application of Phillip J. Cade and Donald J. MacDougall, Serial No. 209,157, filed February 2, 1951. Other circuits of the prior art, however, may be satisfactorily utilized with the conductivity cell disclosed herein to produce any of the conventional functions of conductivity cells.

Furthermore, while the above-described arrangements are illustrative of the principles of this invention, it should be obvious to persons skilled in the art to which this invention pertains, that numerous modifications may be made without departing from the scope of the invention.

What is claimed is:

1. An automatic temperature-compensating conductivity cell comprising a cell tube, an adapter piece coupled to said cell tube, a removable metallic outer electrode coupled to said cell tube by said adapter piece, a metallic container electrode enveloped by said outer electrode, a disc-shaped solid resistor having two flat circular surfaces and being positioned within said container electrode, one of said surfaces being soldered directly to said container electrode, a sealing ring of polytetra-fluorethylene electrically insulating said outer electrode from said container electrode, said adapter piece and said container electrode each having an annular tooth contacting said sealing ring, an electrode holder coupled to said container electrode, and a spring coupled to said electrode holder and applying a force which causes said annular teeth to bite deeply into said sealing ring whereby a liquid seal is formed between said outer electrode and said container electrode.

2. An automatic temperature-compensating conductivity cell comprising a cell tube, an adapter piece, a tubular electrode coupled to said cell tube by said adapter piece, a container electrode mechanically coupled to said tubular electrode, an impedance element positioned within said container electrode, a resilient sealing ring insulating said electrodes from one another, said adapter piece and said container electrode each having an annular tooth contacting said sealing ring, and means including a spring applying a force causing said teeth to sink deeply into said sealing ring whereby a liquid seal is formed between said electrodes.

3. An automatic temperature-compensating conductivity cell comprising a cell tube, an adapter piece, a tubular electrode coupled to said cell tube by said adapter piece, said adapter piece having an inner recess with an annular tooth formed therein, a resilient sealing ring fitting into said recess, an electrode holder positioned within said sealing ring and through said adapter piece, an impedance element, a container electrode including said impedance element positioned within said sealing ring and being coupled to said electrode holder, and means including a spring coupled to said electrode holder applying a force to cause said adapter piece, container electrode and electrode holder to compress said resilient ring whereby a liquid seal is formed between said electrodes.

4. An automatic temperature-compensating conductivity cell comprising a cell tube, an adapter piece, a tubular electrode coupled to said cell tube by said adapter piece, said adapter piece having an inner recess, a resilient sealing ring fitting into said recess, an electrode holder positioned within said sealing ring and through said adapter piece, an impedance element, a container electrode including said impedance element positioned within said sealing ring and being coupled to said electrode holder, and means including a spring coupled to said electrode holder applying a force to cause said adapter piece, container electrode and electrode holder to compress said resilient ring whereby a liquid seal is formed between said electrodes.

5. An automatic temperature-compensating conductivity cell comprising a thin-walled, metallic container electrode having a circular, flat bottom and a tubular side wall, a tubular metallic outer electrode partially enveloping said container electrode, a disc-shaped solid resistor having two flat circular surfaces and being located within said container electrode, one of said surfaces being fastened directly to the inside bottom of said container electrode whereby a high conductivity thermal path is provided between said resistor and the liquid under test, means including a partly tubular resilient ring partially enveloping said container electrode for electrically insulating said outer electrode from said container electrode and for providing a liquid seal therebetween, said container electrode having an annular tooth formed upon the upper edge of the sidewall thereof, and means including a spring coupled to said electrode holder for causing said tooth to sink deeply into said resilient ring.

6. An automatic temperature-compensating conductivity cell comprising a thin-walled, metallic container electrode having a circular, bottom and a tubular side wall, a metallic outer electrode partially enveloping said container electrode, a solid impedance element fastened directly to the inside bottom of said container electrode and being separated slightly from the inside surface of said tubular side wall, a partly tubular resilient sealing ring insulating said outer electrode from said container electrode, one or more annular teeth contacting said ring, and means including a spring coupled to said electrode holder for applying a compressing force to said sealing ring and causing said teeth to sink deeply therein, whereby a liquid seal is formed between said outer and container electrodes.

7. An automatic temperature-compensating conductivity cell comprising a first electrode, coupling means including an adapter piece, a second electrode mechanically coupled to said first electrode by said coupling means, a solid impedance element positioned within said first electrode, substantially half of the outer surface of said impedance element being fastened directly to said first electrode, partly tubular resilient insulating means partially enveloping said first electrode and electrically insulating said electrodes one from the other, an annular tooth formed upon said adapter piece and contacting said resilient insulating means, and means including a spring coupled to said electrode holder for applying a compressing force to said insulating ring and causing said tooth to sink deeply therein whereby a liquid seal is formed.

PHILLIP J. CADE.
BURTON E. SHAW.

REFERENCES CITED

The following references are of record in the file of this patent:

UNITED STATES PATENTS

| Number | Name | Date |
|---|---|---|
| Re. 23,282 | Thomson | Oct. 10, 1950 |
| 1,670,640 | Smith | May 22, 1928 |
| 2,533,462 | Ingram | Dec. 12, 1950 |
| 2,560,209 | Borell et al. | July 10, 1951 |